M. A. FORSLUND.
ANIMAL TRAP.
APPLICATION FILED OCT. 1, 1908.
1,018,657.
Patented Feb. 27, 1912.
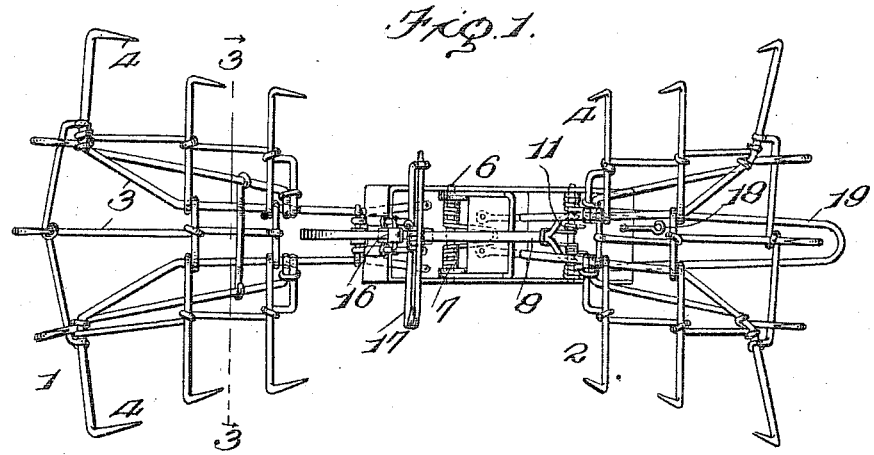
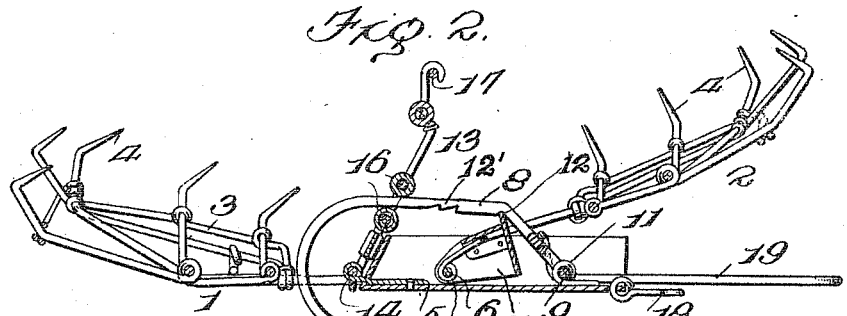
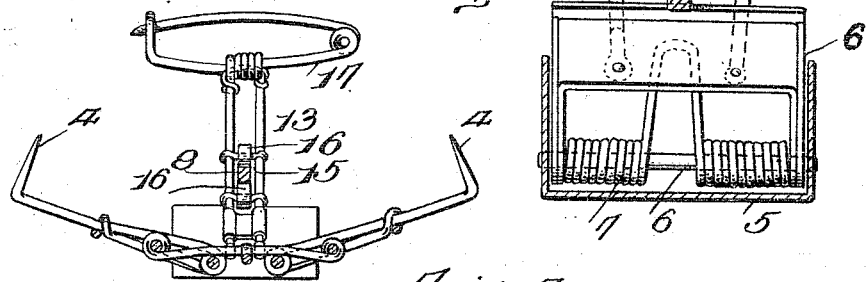
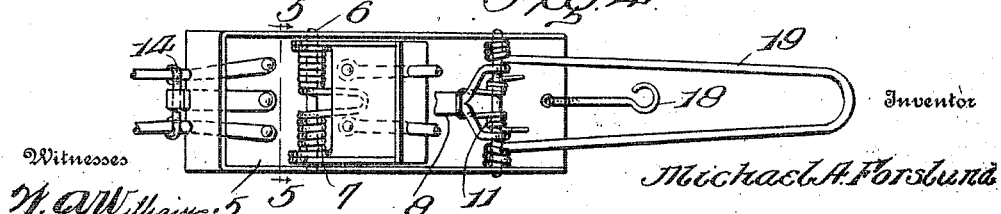
Witnesses
W. G. William
F. Sayou
Inventor
Michael A. Forslund
By Jas. A. Richmond
Attorney

UNITED STATES PATENT OFFICE.

MICHAEL A. FORSLUND, OF MARINETTE, WISCONSIN.

ANIMAL-TRAP.

1,018,657.  Specification of Letters Patent.  Patented Feb. 27, 1912.

Application filed October 1, 1908. Serial No. 455,682.

*To all whom it may concern:*

Be it known that I, MICHAEL A. FORSLUND, a citizen of the United States, residing at Marinette, in the county of Marinette and State of Wisconsin, have invented certain new and useful Improvements in Animal-Traps, of which the following is a specification.

The aim and purpose of the invention is to make the trap as light as possible by constructing the jaws of wire; to simplify and cheapen the construction by reducing the number of parts; and to enhance the effectiveness of the trap by making its action smooth and instantly responsive.

The nature, characteristic features and scope of the invention will be more readily understood from the following description taken in connection with the accompanying drawing, forming a part hereof, and wherein—

Figure 1, is a top view of the trap with the jaws in open position. Fig. 2, is a longitudinal sectional view. Fig. 3, is a section on line 3—3 of Fig. 1. Fig. 4, is a detail of the base; and Fig. 5, is a section on line 5—5 of Fig. 4.

Referring to the drawings, 1 and 2, are jaws relatively movable and they are composed of interlaced wires 3, that terminate in points or impaling members 4. The jaw 1, is the bottom jaw and is rigidly secured to a sheet metal base 5. The other jaw is carried by a V-shape frame 6', which has a cross-bar 6, that passes through the side walls of the base 5, and constitutes a hinge element. A spring 7, on said cross-bar, tends to force the jaw 2, against its complemental jaw. For holding the jaws apart there is a detent or locking and releasing member 8. The member 8, is hinged as at 9, to the base 5, of the trap, and is bent upwardly at an angle, and then forwardly and finally terminates in a curved part 10, that passes beneath the bottom jaw and may bear on the ground. This member is under the force of a spring 11, and has a serration or notch 12, which engages the jaw 2, and holds it "set". Additional notches 12' are provided in advance of the notch 12, the function of which is to prevent the animal spreading the jaws once it has been caught.

13, represents the trigger or releasing-member, and as shown it is hinged or pivoted as at 14, and has a slot 15, through which the member 8, passes, and rollers 16, which bear against said member. At its top the trigger or part 13, is provided with suitable bait-holding means, such as the safety pin arrangement 17. It will be understood that a slight movement of the trigger or release mechanism will shift the part 8, and cause it to disengage itself from the jaw 2, and thus release said jaw.

18, is a hook-like member adapted for engagement, if desired, with the jaw 2, to prevent the same from suddenly closing while the bait is being applied.

19, is a link member or fastening device whereby the trap may be anchored.

Having described the nature and objects of the invention, what I claim as new and desire to secure by Letters Patent is:—

An animal trap comprising impaling jaws, whereof one is movable relatively to the other, a spring-pressed pivotal detent for holding the movable jaw in open position, a bait-holding trigger for releasing said detent, said trigger having a slot through which the detent passes and having rollers which bear against the detent, and means for positively securing the movable jaw while the trap is being baited, substantially as specified.

In testimony whereof I have hereunto signed my name in the presence of two subscribing witnesses.

MICHAEL A. FORSLUND.

Witnesses:
A. F. PETERSON,
D. S. AMBROSE.